Patented Oct. 26, 1948

2,452,326

UNITED STATES PATENT OFFICE 2,452,326

CONTROLLED OXIDATION OF PARAFFINIC HYDROCARBONS

Frederick F. Rust and William E. Vaughan, Berkeley, Calif., assignors to Shell Development Company, San Francisco, Calif., a corporation of Delaware No Drawing. Application January 30, 1943, Serial No. 474,220

8 Claims. (Cl. 260—533)

This invention relates to the controlled oxidation of paraffinic hydrocarbons and their halogenated derivatives containing a replaceable hydrogen atom, and more particularly pertains to the catalytically controlled oxidation of such organic compounds to produce high yields of predetermined carboxylic acids, ketones, and/or organic peroxides having the same number of carbon atoms per molecule as the primary material treated.

The oxidation of various hydrocarbons has been effected for a number of years both non-catalytically and in the presence of various catalysts. As a general rule, most if not all of these oxidations resulted in considerable decomposition of the hydrocarbons, i. e. cleavage of carbon bonds of the organic starting material. Also, the products of reaction of such oxidations contain various percentages of hydrocarbons which have been oxidized to a greater or lesser extent. For instance, the catalytic oxidation of paraffinic hydrocarbons in accordance with the teachings of the prior art formed mixtures containing various percentages of aldehydes, alcohols, acids, acetals, esters, ketones and other hydrocarbon-oxygen compounds. Furthermore, as noted, these various oxygenated compounds contained various numbers of carbon atoms per molecule due to the carbon to carbon scission as well as to polymerizations, condensations, and other side reactions. Although most of the oxygenated organic compounds formed as a result of the partial oxidation of hydrocarbons according to the known processes are generally more valuable than the primary materials subjected to the oxidation reaction, the fractionation of the reaction mixtures and the separate recovery of the individual compounds therefrom are frequently very difficult, if not commercially impossible, or at least greatly increase the cost of the final product or products.

It is also frequently desirable to obtain predominantly carboxylic acids, peroxides and/or ketones rather than mixtures containing them and large amounts of other oxygenated compounds, e. g. the corresponding aldehydes and alcohols. Furthermore, it is usually more important or desirable to obtain such oxygenated compounds having the same number of carbon atoms per molecule as the starting material. In all such cases the known methods of partial oxidation of hydrocarbons, whether they be catalytic or non-catalytic, are uneconomical because of the partial decomposition of the starting materials to form compounds containing fewer carbon atoms per molecule, and due to the formation of mixtures of compounds which are oxygenated to a greater or lesser degree.

It is therefore the main object of the present invention to avoid the above and other defects and to provide a novel process whereby high yields of predetermined oxygenated organic compounds may be obtained. A further object of the invention is to provide a process for the production of high yields of carboxylic acids, organic peroxides, and/or ketones to the substantial exclusion of other oxygenated organic compounds. A still further object is to provide a process whereby predetermined carboxylic acids, organic peroxides, and/or ketones having the same number of carbon atoms per molecule as the starting material may be produced in economical yields to the substantial exclusion of other products of oxidation which are normally formed when hydrocarbons are subjected to partial oxidation in accordance with the processes of the prior art. Another object is to provide a novel process for the catalytic oxidation of ethane and/or ethyl halides to produce high yields of acetic acid and/or a halogenated acetic acid, respectively, without substantial conversion of the primary material to other oxygenated products, such as aldehydes and alcohols. Still another object is to provide a novel process for the controlled catalytic oxidation of aliphatic, saturated hydrocarbons having three or more carbon atoms per molecule to form either the corresponding ketones or the corresponding carboxylic acids having the same number of carbon atoms per molecule, or mixtures thereof, to the substantial exclusion of other oxygenated compounds including those having a lesser number of carbon atoms per molecule. The term "ketone" as employed herein and in the appended claims, refers to organic compounds having one or more carbonyl groups, and therefore includes diketones.

It has now been discovered that the above and other objects may be attained by effecting the partial oxidation in the presence of hydrogen bromide employed as a catalyst. More specifically stated, the invention resides in the controlled oxidation of saturated aliphatic hydrocarbons and of their halogenated derivatives having at least one replaceable hydrogen atom, i. e. the partially halogenated derivatives of such saturated aliphatic hydrocarbons, in the presence of a catalyst consisting of or comprising hydrogen bromide or a compound capable of yielding hydrogen bromide under the operating conditions. In one of its more specific embodiments, the invention resides in the production of carboxylic acids, organic peroxides, and/or ketones (including diketones) by the controlled oxidation of saturated aliphatic hydrocarbons and/or halogenated derivatives thereof containing at least one replaceable hydrogen atom, by subjecting said primary materials to the action of oxygen, an oxygen-containing or oxygen-yielding material in the presence of hydrogen bromide or a substance capable of yielding hydrogen bromide under the operating conditions, this oxidation reaction being effected under temperature and pressure conditions which are below those capable of causing spontaneous combustion.

The above-outlined invention is predicated on the discovery that the presence of a hydrogen halide, and particularly of hydrogen bromide, during the vapor phase oxidation of the above-mentioned and hereinbelow more fully described saturated organic compounds, controls the oxidation reaction so that the oxidation occurs on the carbon atom or atoms to which a bromine atom would normally attach itself if the starting material were subjected to a halo-substitution, e. g. brom-substitution reaction. For instance, a bromine atom, under proper operating conditions, will readily replace a hydrogen atom on either of the carbon atoms of an ethane molecule. In the case of the oxidation in accordance with the process of the present invention in the presence of hydrogen bromide, the resultant reaction mixture will predominate in acetic acid. On the other hand, the brom-substitution of propane will form both isopropyl bromide and n-propyl bromide, although the reaction mixture will normally contain more of the former than of the latter. Similarly, when propane is subjected to the action of oxygen in the presence of hydrogen bromide catalyst under operating conditions which prevent spontaneous combustion, the reaction mixture will predominate in acetone and will contain some propionic acid, thus clearly illustrating the directional catalytic effect of hydrogen bromide during the partial and controlled oxidation of the saturated organic compounds in the presence of hydrogen bromide. Also, the presence of hydrogen bromide or compounds capable of yielding it under the operating conditions, besides retarding the explosion or complete combustion of the organic starting material, has the effect of inhibiting decomposition of the carbon structure of such organic starting materials, so that the resultant oxygenated compound contains the same number of carbon atoms per molecule as the starting material.

Although the process of the present invention is applicable to the controlled oxidation of various saturated aliphatic organic compounds, it finds particular adaptability for the oxidation of saturated aliphatic hydrocarbons having two or more carbon atoms per molecule, as well as of their halogenated derivatives which contain at least one replaceable hydrogen atom. As representative saturated aliphatic hydrocarbons which may be thus oxidized according to the present invention, reference may be made to ethane, propane, n-butane, isobutane, pentanes, and their higher homologues. As examples of alkyl halides which may be used as starting materials, reference is made to ethyl chloride, ethyl bromide, n-propyl chloride, n-propyl bromide, n-butyl halides, tertiary butyl halides, and their higher homologues, as well as the corresponding polyhalogenated derivatives which, however, contain at least one replaceable hydrogen atom. The lower homologues of these saturated aliphatic hydrocarbons are especially suitable as the organic starting materials.

It was stated above that the slow (i. e. non-explosive) controlled oxidation of the above-outlined class of saturated aliphatic hydrocarbons and of their halogenated derivatives, is effected in accordance with the present invention at temperatures which are below those at which spontaneous combustion or substantial decomposition of the carbon structure occurs. This upper temperature limit will at least in part depend on the specific organic substance treated, as well as on the proportions thereof and/or of the oxygen and hydrogen bromide present in the vaporous mixture subjected to the elevated temperatures. For instance, other conditions being equal, an increase in the hydrogen bromide content of the mixture lowers the temperature at which spontaneous combustion will occur. Thus, whereas the spontaneous combustion temperature for an equivolumetric gaseous or vaporous mixture of propane, oxygen and hydrogen bromide is in the neighborhood of 175° C., a 75% decrease in the amount of hydrogen bromide employed will permit an increase in the reaction temperature to above about 210° C. without reaching the spontaneous combustion or explosive region for this mixture. On the other hand, ethane is a less sensitive material and, particularly when inert diluents are employed, may be heated together with oxygen and hydrogen bromide to temperatures as high as 250° C. or even 270° C. without causing the mixture to decompose with the concurrent formation of high yields of carbon. In this connection, it is to be noted that excessively high temperatures, even though they are below the explosive region, should be avoided because of certain undesirable side reactions such as the excessive conversion of hydrogen bromide to alkyl bromides. Although, as will be brought out hereinbelow, this in itself is not detrimental due to the fact that the alkyl bromides themselves may be treated in accordance with the present invention to form carboxylic acids and hydrogen bromide (so that in effect at least a portion of the hydrogen bromide is regenerated and may be re-used), the excessive formation of alkyl bromides during, for example, the controlled oxidation of a given paraffinic hydrocarbon is undesirable because this decreases the catalyst concentration and thus may affect the yield or output of the desired oxygenated product or products. Generally, it may be stated that, for the lower saturated aliphatic hydrocarbons, the upper temperature limit is in the neighborhood of about 200° C., although with shorter contact periods this temperature may be raised to approximately 225° C., or even somewhat higher. Some of the more readily oxidizable saturated compounds, however, may be economically oxidized, in accordance with the present process, at temperatures as low as from about 150° C. to 180° C. With a further decrease in the operating temperature, the output of product per unit time will decrease so that at temperatures of below about 100° C. the controlled oxidation in the presence of hydrogen bromide, or substances capable of yielding it under the operating conditions, may become uneconomical.

The reaction may be effected in the liquid, vapor, or mixed phase. Due to the fact that it is difficult to maintain a desirable high oxygen concentration when the reaction is conducted in the liquid phase, it is generally preferable to effect the oxidation according to the present invention in the vapor phase. Since some of the relatively higher boiling saturated aliphatic hydrocarbons and their halogenated derivatives cannot be effectively maintained in the vapor phase and in contact with sufficient concentrations of oxygen and of hydrogen bromide without causing spontaneous combustion and the resultant excessive carbon formation, the oxidation of such compounds may be readily effected in the presence of inert diluents such as steam, nitrogen, carbon dioxide and even methane, which latter is relatively stable at temperatures at which the other hydrocarbons and the corresponding alkyl halides may be oxidized according to the invention. Of the above diluents, the use of steam is believed to be most advantageous because hydrogen bromide may then be removed from the reaction mixture as an overhead fraction in the form of its constant boiling mixture of hydrogen bromide and water.

Although the volumetric ratio of the organic starting material to the oxygen may vary within relatively wide limits, it may be stated that satisfactory yields of the desired oxygenated product or products can be obtained by using equivolumetric quantities thereof. An increase in the ratio of oxygen to the organic material in the treated mixture may increase the yield of the desired carboxylic acids and/or ketones. However, any undue increase in this ratio is dangerous because of excessive explosion hazards. On the other hand, the use of oxygen to hydrocarbon ratios which are considerably below equivolumetric will lower the output of the desired product per unit of time because of the presence of less oxygen per unit of space. This renders the process less economical, although operable. In fact, it must be noted that a lowering of the oxygen to hydrocarbon or oxygen to alkyl halide ratios may cause a faster consumption of the oxygen per unit of time. It was stated above that satisfactory yields of the desired oxygenated products may be obtained when equivolumetric mixtures of oxygen and of the specified organic starting material are subjected to the action of hydrogen bromide at the specified operating temperatures. Such mixtures usually present no hazards in so far as explosions are concerned, it being noted that the hydrogen bromide apparently acts as an explosion-retardant or inhibitor. For instance, when one part by volume of oxygen and one part by volume of ethane were introduced into an evacuated glass bottle containing two spaced wires, one of which was connected to a sparking coil while the other was grounded, the mixture exploded and a considerable amount of carbon was found in the bottle. On the other hand, when a mixture consisting of one part of hydrogen bromide, two parts of ethane, and two parts of oxygen was subjected to the same treatment, this mixture could not be exploded, thus clearly indicating the explosion-retardant action of the hydrogen bromide.

The amount of hydrogen bromide employed as the catalyst may also vary within relatively wide limits, although optimum amounts may be readily determined for each individual starting material treated, as well as for the specific operating conditions employed. Generally speaking, the percentage of oxygen which will react to form the oxygenated products will vary with the change in the hydrogen bromide concentration in the mixture subjected to treatment. When the hydrogen bromide concentration is varied from zero to about 20% there is a proportional and noticeable change in the percentage of oxygen which reacts with the organic starting material. Increases in the volumetric or mole concentration of the hydrogen bromide above about 20%, however, does not have such a marked effect on the percentage of oxygen which will react. Nevertheless, very high hydrogen bromide concentrations will cause excessive dilution and thus decrease the output of the desired product or products. Such high concentrations should, therefore, be avoided for economic reasons.

The oxidation, in accordance with the present process, may be effected at atmospheric pressures, although higher or lower pressures may also be employed. In fact, when the oxidation is effected in a continuous manner it is generally preferable to employ superatmospheric pressures because more of the mixture subjected to treatment may be conveyed through a given unit of reaction space per unit of time.

The invention may be executed in a batch, intermittent or continuous manner. When operating in a continuous system, all of the reactants and the catalyst, e. g. hydrogen bromide, may be first mixed together and the mixture may then be conveyed through the whole length of the reaction zone. In the alternative, it is possible to introduce at least a portion of the catalyst and/or of one or both of the reactants, i. e. the oxygen and/or the saturated aliphatic hydrocarbon or its halogenated derivative, at various intermediate points along the reaction zone. Such operation may be frequently desirable to control the operating conditions in the reaction zone. Generally, the contact time may vary within relatively wide limits and is at least in part dependent on the other operating conditions such as the specific starting material, the ratios thereof to the oxygen and/or the catalyst, the presence of an inert diluent, the operating temperatures and pressures, etc. In a continuous system it has been found that satisfactory yields of the desired carboxylic acids, organic peroxides, and/or ketones may be obtained with contact periods of between about one and about three minutes, although shorter and longer residence times may also be employed.

Instead of using pure or substantially pure oxygen for the oxidation in accordance with the process of the present invention, it is also possible to employ oxygen-containing mixtures, such as air, or even substances capable of yielding molecular oxygen under the operating conditions. Also, although the examples presented hereinbelow are directed specifically to the use of hydrogen bromide as the catalyst, the process of the present invention may also be realized by using substances capable of yielding hydrogen bromide under the operating conditions employed.

The invention is illustrated by the following examples which are presented herein for the purpose of showing the process of the present invention as well as the results and advantages obtained therefrom. It is understood, however, that these examples are merely illustrative of the invention and should not be considered as limiting the invention in any sense.

*Example I*

The reactor consisted of a glass coil having an internal diameter of 25 mm. This coil had a volume equal to 2940 cc. and was immersed in an oil bath which permitted accurate control of the reaction temperature. A preheated gaseous mixture of propane, oxygen and hydrogen bromide, which substances were used in a volumetric ratio of 2:2:1, was then conveyed at substantially atmospheric pressure through the coil at such a rate that the residence time was equal to about 3 minutes; the temperature was maintained at about 184° C. It was found that under these conditions about 58% of the introduced oxygen reacted to form oxygenated products. An analysis of the reaction products also showed that about 74.7 mol percent of the reacted propane was converted to acetone, that about 7.8 mol percent of the reacted propane was converted to propionic acid, and that about 9.6 mol percent of the propane was recovered as propyl bromide. As will be shown below, the overall yield of the desirable oxygenated products can be further increased by treating the propyl bromide in accordance with the present process to produce added quantities of the corresponding acid and/or ketone. Approximately 81% of the introduced hydrogen bromide was recovered in an unchanged state.

In the above example, the effluent products leaving the reaction zone were collected and neutralized by means of an aqueous sodium carbonate solution because it was found that such neutralization was necessary to prevent substantial condensation of the acetone to mesityl oxide and higher molecular weight compounds. Obviously, other means of preventing or inhibiting this reaction may also be employed. Also, in some instances it may even be desirable to effect such conversion of the acetone to mesityl oxide. In such a case, the conditions in the product collection system could be regulated to produce the mesityl oxide directly without any preliminary separation of the acetone from the effluent products leaving the oxidation reaction zone.

Example II

A gaseous mixture consisting of 2 parts by volume of propane, 2 parts by volume of oxygen and 1 part by volume of hydrogen bromide was conveyed through the same reactor as that used in the above-described run. The residence time was also about 3 minutes, but the reaction temperature was raised to and maintained at 188° C. instead of the 184° C. used in Example I. It was found that about 87% of the oxygen reacted, and that about 88% of the hydrogen bromide was recovered in an unchanged state. An analysis of the effluent product showed that about 76.1 mol percent of the reacted propane was converted to acetone, while about 11.2 mol percent of the reacted propane was converted to propionic acid. About 7.6 mol percent of the reacted propane was recovered as propyl bromide, which, as stated, may be converted to acetone and/or propionic acid and to hydrogen bromide by further treatment according to the process of the present invention.

For purposes of comparison, an equivolumetric gaseous mixture of propane and oxygen was conveyed in the absence of hydrogen bromide through the above-described coil while being maintained at the above and even considerably higher temperatures. It was found that no reaction occurred until the reaction temperature was raised to above 300° C. In fact, in batch runs at about 300° C., there were very long induction periods (of about 12 minutes), and the reaction products predominated in carbon monoxide, carbon dioxide, olefins and water, and also contained a large number of more or less oxygenated products, such as alcohols, aldehydes, acids, acetals, etc., etc., most of which had a different number of carbon atoms per molecule from that of propane.

Example III

The reactor described in Example I was employed. A gaseous mixture consisting of 1 part by volume of hydrogen bromide, 2 parts by volume of oxygen and 2 parts by volume of ethane was conveyed therethrough at atmospheric pressure and at such a rate that the residence time was 1.5 minutes. The temperature in the coil was maintained at about 227° C. It was found that about 57.5% of the introduced oxygen reacted to form oxygenated products, and that 78.8% of the hydrogen bromide was recovered in an unchanged state. An analysis of the effluent gases also showed that about 63 mol percent of the consumed ethane was converted to acetic acid, while 22.5 mol percent of said reacted ethane was converted to ethyl bromide. The effluent product also contained very minor amounts of carbon monoxide, carbon dioxide and ethylene. No alcohols or aldehydes were found in the products of reaction.

Example IV

A gaseous mixture consisting of ethane, oxygen and hydrogen bromide, employed in a volumetric ratio of 3.2:2:1, was conveyed through the above described reactor coil, at atmospheric pressure and at such a rate that the residence time was about 1.5 minutes. The reaction was effected at a temperature of about 227° C. An analysis of the effluent mixture showed that about 57.5% of oxygen did react. Approximately 61.6 mol percent of the reacted ethane was converted to acetic acid, and about 19.7 mol percent of the ethane was converted to ethyl bromide. About 75.5% of the hydrogen bromide was recovered unchanged. A comparison of the last two runs (Examples III and IV) shows that, at least under the operating conditions employed, a decrease in the ethane-to-oxygen-to-hydrogen bromide ratio from 2:2:1 to 3.2:2:1 did not materially affect the results.

Example V

This run was identical with that described in Example III, with the exception that the reaction or residence time was increased from 1.5 minutes to about 3 minutes. This increase in the residence time increased the percentage of reacted oxygen from 57.5% to about 88%. Also, an analysis of the effluent mixture showed that a greater amount (71.3 mol percent) of the reacted ethane was converted to acetic acid, while the percentage of alkyl bromide decreased to about 16.7 mol percent. As in the previous cases, only very minor amounts of products of degradation, e. g. carbon monoxide, carbon dioxide, ethylene, etc., were found, while alcohols and aldehydes were completely absent.

As in the case with propane, no oxidation of ethane was noticed when the reaction was attempted in the absence of hydrogen bromide, even when the temperature of the ethane-oxygen mixture was raised to above 300° C.

Example VI

A mixture of n-butane, oxygen and hydrogen bromide was subjected, at about atmospheric pressure, to a temperature of about 175° C. The volumetric ratio of the constituents of this gaseous mixture was equal to 2:2:1. The residence time was about 3 minutes. An analysis of the effluent mixture showed that about 97% of the oxygen reacted. The yields of butyric acid, diacetyl and methyl ethyl ketone were about 27.4%, 21% and 29.5%, respectively, as based on the oxygen used.

*Example VII*

Ethyl bromide, oxygen and hydrogen bromide were conveyed through a tubular reactor at a rate of 42 cc. per minute of ethyl bromide, 42 cc. per minute of oxygen and 20 cc. per minute of hydrogen bromide. The reaction was effected substantially at atmospheric pressure and at a temperature of about 196° C. The residence time was equal to between about 2.5 and 3 minutes. As a result of the oxidation of the ethyl bromide at least 30% of the bromine in the ethyl bromide was recovered as hydrogen bromide. Of the organic acids thus formed, about 20% was bromacetic acid, the remainder being acetic acid.

*Example VIII*

The mixture employed in this run consisted of n-propyl bromide, oxygen, hydrogen bromide and nitrogen, the latter being used as a carrier for the n-propyl bromide. This vaporous mixture was conveyed through a reactor (having a volume equal to 450 cc.) at a rate of 30 cc. per minute of n-propyl bromide, 30 cc. per minute of oxygen, 30 cc. per minute of nitrogen, and 15 cc. per minute of hydrogen bromide. (The above inputs were measured as gases at room temperature and atmospheric pressure.) An analysis of the effluent gases showed that organic acids, such as propionic acid, were produced at a rate of about 5 cc. per minute, and that brom-acetone was formed at a rate of about 3.6 cc. per minute, measured as gases at room temperature and atmospheric pressure. The oxygen consumption was about 86%. At least 10% of the bromine in the n-propyl bromide was recovered as hydrogen bromide.

When the same gaseous mixture was subjected to an identical treatment but at a temperature of about 177° C., there was less oxygen consumption and less decomposition, although the yield of brom-ketone was higher (about 4.13 cc. per minute).

We claim as our invention:

1. A process for the production of methyl ethyl ketone and diacetyl which comprises subjecting a vaporous mixture containing normal butane and oxygen at substantially atmospheric pressure and at a temperature of above about 100° C. but below the temperature at which spontaneous combustion occurs, to the action of hydrogen bromide employed in an amount in excess of about 20 mol percent, effecting the reaction for a period of time sufficient to cause the controlled catalytic oxidation of the normal butane, and recovering the ketones from the reaction mixture thus formed.

2. A process for the production of methyl ethyl ketone and diacetyl which comprises subjecting a vaporous mixture containing normal butane and oxygen to the action of hydrogen bromide at an elevated temperature which is below the spontaneous combustion temperature of the mixture, effecting said reaction for a period of time sufficient to cause the controlled catalytic oxidation of the normal butane, and recovering the ketones from the reaction mixture thus formed.

3. A process for the production of acetone which comprises subjecting a substantially equivolumetric gaseous mixture of propane and oxygen at substantially atmospheric pressure and at an elevated temperature of below about 200° C. to the action of hydrogen bromide catalyst for a period of time sufficient to effect the controlled catalytic oxidation of the propane, and recovering acetone from the reaction mixture thus formed.

4. A process for the production of acetone and propionic acid which comprises subjecting a vaporous mixture of propane and oxygen to the action of hydrogen bromide, at a temperature of between about 100° C. and the temperature at which spontaneous combustion occurs, effecting the reaction for a period of time sufficient to cause the controlled catalytic oxidation of the propane, and recovering acetone and propionic acid from the reaction mixture thus formed.

5. A process for the production of acetic acid which comprises subjecting a substantially equivolumetric mixture of ethane and oxygen at substantially atmospheric pressure and at a temperature of between about 200° C. and about 225° C. to the action of hydrogen bromide catalyst for a period of time sufficient to effect the controlled catalytic oxidation of the ethane, and recovering acetic acid from the reaction mixture thus formed.

6. The process according to claim 5 wherein hydrogen bromide is employed in an amount which is in excess of about 20 mol percent.

7. A process for the production of acetic acid which comprises subjecting a mixture of ethane, oxygen and hydrogen bromide to the action of an elevated temperature of between about 100° C. and the temperature at which spontaneous combustion occurs, effecting the reaction for a period of time sufficient to cause the controlled catalytic oxidation of the ethane, and recovering acetic acid from the reaction mixture thus formed.

8. In a process for the production of oxygenated organic compounds, the steps of subjecting a saturated aliphatic hydrocarbon containing two to five carbon atoms per molecule to the action of oxygen in the presence of hydrogen bromide, and effecting the reaction at a temperature between about 100° C. and the temperature at which spontaneous combustion and the resultant decomposition of the hydrocarbon will occur.

FREDERICK F. RUST.
WILLIAM E. VAUGHAN.

REFERENCES CITED

The following references are of record in the file of this patent:

UNITED STATES PATENTS

| Number | Name | Date |
|---|---|---|
| 1,895,799 | James | Jan. 31, 1933 |
| 1,923,610 | Bludworth | Aug. 22, 1933 |
| 1,924,763 | Carpenter | Aug. 29, 1933 |
| 1,924,767 | Carpenter | Aug. 29, 1933 |

OTHER REFERENCES

"Inorganic Chemistry," Smith (1915), pages 183, 232, 233, 242 and 243.